United States Patent
Iyama

(10) Patent No.: US 7,609,448 B2
(45) Date of Patent: Oct. 27, 2009

(54) LIGHT DIFFUSER PLATE

(75) Inventor: Hironobu Iyama, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/187,857

(22) Filed: Aug. 7, 2008

(65) Prior Publication Data

US 2009/0040618 A1 Feb. 12, 2009

(30) Foreign Application Priority Data

Aug. 9, 2007 (JP) ............................. 2007-207649

(51) Int. Cl.
*G02B 5/02* (2006.01)
(52) U.S. Cl. ..................................... 359/599
(58) Field of Classification Search ................. 359/599
See application file for complete search history.

(56) References Cited

U.S. PATENT DOCUMENTS

| 7,224,525 | B2 | 5/2007 | Osawa | |
|---|---|---|---|---|
| 2007/0160828 | A1 | 7/2007 | Iyama | |
| 2008/0050539 | A1* | 2/2008 | Hamamatsu et al. | 428/1.55 |
| 2008/0174874 | A1* | 7/2008 | Kanaya | 359/599 |
| 2008/0268235 | A1* | 10/2008 | Kimura et al. | 428/327 |

* cited by examiner

*Primary Examiner*—Alessandro Amari
*Assistant Examiner*—Mark Consilvio
(74) *Attorney, Agent, or Firm*—Sughrue Mion, PLLC

(57) ABSTRACT

An object of the present invention is to provide a light diffuser plate (1) which can illuminate the front side more brightly when incorporated in a surface light source (3) constituting a transmissive image display (2).

The light diffuser plate of the present invention comprises a transparent resin and a light diffuser dispersed in the transparent resin, wherein the transparent resin is a transparent resin which has a light transmittance $[T_{600}]$ at a wavelength of 600 nm of 85% or more measured with respect to a thickness of a 2 mm thick plate-shaped specimen, and a ratio $[T_{365}/T_{600}]$ of a light transmittance $[T_{365}]$ at a wavelength of 365 nm to the light transmittance $[T_{600}]$ is 0.90 to 0.99. The transparent resin is polystyrene or the like, an average particle diameter of the light diffuser is from 0.5 to 5 µm, an absolute value $[|\Delta n|]$ of a difference in a refractive index between the light diffuser and the transparent resin is 0.05 or more, an amount of the light diffuser is from 0.1 to 10 parts by mass based on 100 parts by mass of the transparent resin, and the light diffuser plate has a thickness within a range of from 1 to 5 mm.

7 Claims, 1 Drawing Sheet

(a)

(b)

LIGHT DIFFUSER PLATE

BACKGROUND OF THE INVENTION

1. Field of the Invention

This application was filed claiming Paris Convention priority of Japanese Patent Application No. 2007-207649, the entire content of which is herein incorporated by reference.

The present invention relates to a light diffuser plate, and more particularly to a light diffuser plate which is preferably used in a state of being incorporated in a transmissive image display.

2. Description of the Related Art

As shown in FIG. 1, a light diffuser plate (1) is widely used in a state of being incorporated in a surface light source (3) constituting a transmissive image display (2) [Patent Document 1: Japanese Unexamined Patent Publication (Kokai) No.2004-170937]. The transmissive image display (2) shown in FIG. 1 comprises the surface light source (3) and a transmissive image display panel (4) disposed at the front side of the surface light source. The surface light source (3) comprises the light diffuser plate (1) and plural light sources (5) disposed at the back side of the light diffuser plate (1). In the transmissive image display (2), incident light ($L_0$) incident upon the back side of the light diffuser plate (1) from the light source (5) is diffused while transmitting into the light diffuser plate (1), and then diffused light ($L_1$) is emitted from the front side and illuminates the transmissive image display panel (4). As the light diffuser plate (1), a light diffuser plate comprising a colorless and transparent resin having a light diffuser dispersed therein is widely used since a comparatively light weight can be achieved even if the size of an image plane increases.

The light diffuser plate (1) is preferably a light diffuser plate which can illuminate the transmissive image display panel (4) more brightly.

The present inventors have intensively studied so as to develop a light diffuser plate which can illuminate the front side more brightly when used in a state of being incorporated in a surface light source, and found the followings. That is, even if a transparent resin constituting the above light diffuser plate is seen as colorless and transparent with the naked eye, it is usual that a light transmittance [$T_{365}$] at a wavelength of 365 nm is slightly lower than a light transmittance [$T_{600}$] at a wavelength of 600 nm, which may result from impurities incorporated during the manufacturing process. Low light transmittance [$T_{365}$] at a wavelength of 365 nm possibly exerts an influence on the diffusion of transmitted light due to the light diffuser. This leads to an influence on the brightness of the illumination and thus, the present invention has been completed.

SUMMARY OF THE INVENTION

That is, the present invention provides a light diffuser plate comprising a transparent resin and a light diffuser dispersed in the transparent resin, wherein the transparent resin is a transparent resin which has a light transmittance [$T_{600}$] at a wavelength of 600 nm is 85% or more measured with respect to a thickness of a 2 mm thick plate-shaped specimen, and a ratio[$T_{365}/T_{600}$] of a light transmittance [$T_{365}$] at a wavelength of 365 nm to the light transmittance [$T_{600}$], is 0.90 to 0.99.

The surface light source (5) comprising the light diffuser plate of the present invention (1) incorporated therein can illuminate the front side more brightly by light ($L_0$) from the light source (3) disposed at the back side of the light diffuser plate of the present invention (1).

BRIEF DESCRIPTION OF THE REFERENCE NUMERALS

Figure 1:
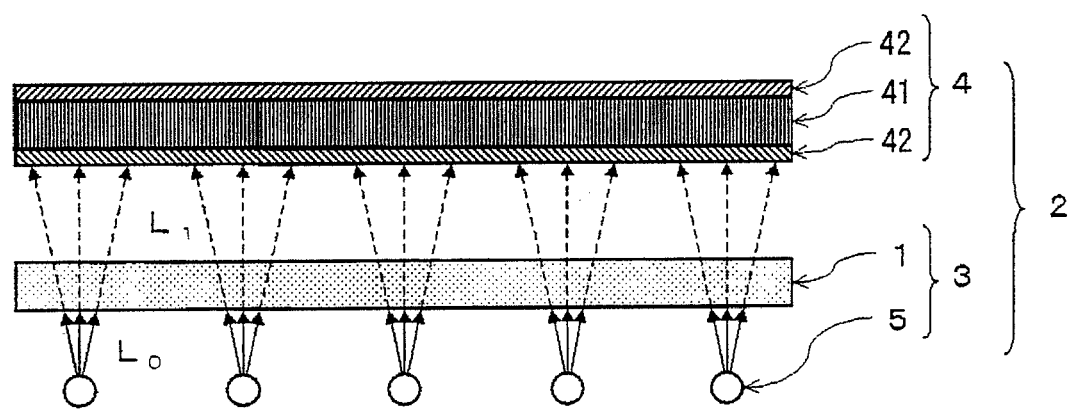
FIG. 1 is a sectional view schematically showing one example of a transmissive image display and a surface light source constituting the same.

1: Light diffuser plate
11: Skin layer
12: Multi-layered light diffuser plate
2: Transmissive image display
3: Surface light source
4: Transmissive image display panel (Transmissive liquid crystal display panel)
41: Liquid crystal cell
42: Linear polarizing plate
5: Light source
$L_0$: Incident light
$L_1$: Diffused light

DETAILED DESCRIPTION OF THE INVENTION

The light diffuser plate of the present invention comprises a transparent resin and a light diffuser dispersed in the transparent resin.

Examples of the transparent resin include polystyrene, a methyl methacrylate-styrene copolymer, a methacrylic acid-styrene copolymer, a maleic anhydride-styrene copolymer, polymethyl methacrylate, a methyl methacrylate-acrylate ester copolymer, polycarbonate, polypropylene, polycycloolefin, and a cycloolefin-α-olefin copolymer. Among these resins, polystyrene, polypropylene, polycycloolefin and a cycloolefin-α-olefin copolymer are preferably used in view of their low moisture absorption.

Since the transparent resin can illuminate the transmissive image display panel (4) at the front side more brightly when incorporated in the transmissive image display (2), a light transmittance [$T_{600}$] at a wavelength of 600 nm of the transparent resin is 85% or more.

A ratio [$T_{365}/T_{600}$] of a light transmittance [$T_{365}$] at a wavelength of 365 nm to a light transmittance [$T_{600}$] at a wavelength of 600 nm of the transparent resin is from 0.90 to 0.99, and preferably 0.95 or more.

The light transmittance [$T_{600}$] at a wavelength of 600 nm and the light transmittance [$T_{365}$] at a wavelength of 365 nm are light transmittances measured using a 2 mm thick plate-shaped specimen with respect to the thickness thereof.

The light transmittance ratio [$T_{365}/T_{600}$] of a conventional transparent resin is usually lower than 0.90, which may result from impurities contained therein. It is not apparent what kind of impurities may exert an influence on the light transmittance ratio [$T_{365}/T_{600}$]. For example, when a monomer used as a material is polymerized in a liquid phase using a method such as a suspension polymerization method or a dispersion polymerization method to prepare a transparent resin, solvents incorporated in the resultant transparent resin or catalyst components and additives to be added to the solvents are considered as impurities. When a gaseous monomer used as a material is brought into contact with a solid catalyst thereby polymerizing the monomer material in order to prepare a transparent resin, this catalyst component is considered as an impurity. Additives to be added in small amounts for various purposes to the transparent resin obtained by polymerization are also considered as impurities. Therefore, the transparent resin showing the light transmittance ratio $[T_{365}/T_{600}]$ defined in the present invention is used by selecting from a transparent resin containing a small amount of additives or catalysts used in the manufacturing process, a transparent resin washed sufficiently after polymerization, a transparent resin which does not contain additives usually added to the transparent resin, and a transparent resin containing a very small amount of additives.

The light diffuser used in the light diffuser plate of the present invention can diffuse light ($L_0$) incident upon a light diffuser plate by a difference [$\Delta n$] in a refractive index between the light diffuser and the transparent resin, and is usually in the form of fine particles.

Examples of the light diffuser include inorganic particles such as glass beads, silica particles, aluminum hydroxide particles, calcium carbonate particles, barium sulfate particles, titanium oxide particles, and talc; and organic particles such as acrylic particles, siloxane-based particles, and styrene-based particles. Among these, organic particles are preferably used since the resultant light diffuser plate has a lower weight, and acrylic particles and siloxane-based particles are used more preferably.

Acrylic particles are particles of a polymer including an acrylic monofunctional monomer unit as a main component, for example, a polymer including 50% by mass or more of an acrylic monofunctional monomer unit, or may be particles of a polymer obtained by using only an acrylic monofunctional monomer as a monomer, the entire (100% by mass) monomer unit being an acrylic monofunctional monomer unit, or particles of a copolymer obtained by copolymerizing an acrylic monofunctional monomer and a monofunctional monomer which is copolymerizable with the acrylic monofunctional monomer.

The acrylic monofunctional monomer include acrylic acid or methacrylic acid, and an ester thereof, and specific examples thereof include methacrylate esters such as methyl methacrylate, ethyl methacrylate, butyl methacrylate, cyclohexyl methacrylate, phenyl methacrylate, benzyl methacrylate, 2-ethylhexyl methacrylate, and 2-hydroxyethyl methacrylate; acrylate esters such as methyl acrylate, ethyl acrylate, butyl acrylate, cyclohexyl acrylate, phenyl acrylate, benzyl acrylate, 2-ethylhexyl acrylate, and 2-hydroxyethyl acrylate; and methacrylic acid and acrylic acid. These acrylic monofunctional monomers may be used alone, or two or more kinds of them may be used in combination.

The monofunctional monomer, which is copolymerizable with the acrylic monofunctional monomer, is a compound which has one radical polymerizable double bond in the molecule and is copolymerizable with the acrylic monofunctional monomer through the double bond. The monofunctional monomer includes, for example, styrene. It also includes substituted styrenes, for example, halogenated styrenes such as chlorostyrene and bromostyrene; alkylstyrenes such as vinyltoluene and α-methylstyrene; and acrylonitrile. These monofunctional monomers may be used alone, or two or more kinds of them may be used in combination.

When acrylic particles are particles of a polymer in which the entire monomer unit is an acrylic monofunctional monomer unit, or particles of a copolymer of an acrylic monofunctional monomer and a monofunctional monomer which is copolymerizable with the acrylic monofunctional monomer, the weight average molecular weight is preferably from about 500,000 to 5,000,000.

Acrylic particles are particles of a compound which has two or more double bonds copolymerizable with an acrylic monofunctional monomer as a copolymer component in the molecule, and is copolymerizable with the acrylic monofunctional monomer through the double bond, and examples of the compound include the same methacrylates of polyhydric alcohols, acrylates of polyhydric alcohols and aromatic polyfunctional compounds as those described in the styrene-based polymer particles. These compounds may be used alone, or two or more kinds of them may be used in combination.

The copolymer of the polyfunctional monomer may be a copolymer with a monofunctional monomer as described above as the monofunctional monomer which is copolymerizable with the acrylic monofunctional monomer.

The copolymer of an acrylic monofunctional monomer and a polyfunctional monomer, which is copolymerizable with the acrylic monofunctional monomer, is a copolymer having a crosslinked structure, and the gel fraction is preferably 10% by mass or more.

The acrylic polymer particles usually have a refractive index of about 1.46 to 1.55, and tend to show a large refractive index as the level of benzene framework and halogen atom content increases. The acrylic polymer particles can be produced, for example, by a conventional polymerization methods such as a suspension polymerization method, a microsuspension polymerization method, an emulsion polymerization method, or a dispersion polymerization method.

The siloxane-based particles are particles of a siloxane-based polymer. The siloxane-based polymer is a polymer produced, for example, by a method of hydrolyzing and condensing chlorosilanes. Examples of chlorosilanes include dimethyldichlorosilane, diphenyldichlorosilane, phenylmethyldichlorosilane, methyltrichlorosilane, and phenyltrichlorosilane. The siloxane-based polymer may be crosslinked. The siloxane-based polymer is crosslinked, for example, by reacting the siloxane-based polymer with a peroxide such as benzoyl peroxide, 2,4-dichlorobenzoyl peroxide, p-chlorobenzoyl peroxide, dicumyl peroxide, or di-t-butyl-2,5-dimethyl-2,5-di(t-butylperoxy)hexane peroxide. When the siloxane-based polymer has a silanol group at the end, it may be subjected to condensation crosslinking with alkoxysilanes. The crosslinked polymer preferably has a structure in which 2 to 3 organic residues are combined per one silicon atom. The siloxane-based polymer is a polymer which is also called a silicone rubber or a silicone resin, and is preferably a polymer which is solid at normal temperature.

The cyclohexane-based particles can be obtained by grinding the cyclohexane polymer. The cyclohexane-based particles can also be obtained as granular particles by curing a curable polymer having a linear organosiloxane block or a composition thereof in a sprayed state (Patent Document: Japanese Unexamined Patent Publication (Kokai) No. 59-68333). The cyclohexane-based particles can also be obtained as granular particles by hydrolytically condensing alkyltrialkoxysilane or a partially hydrolyzed condensate in an aqueous solution of ammonia or amines (Patent Document: Japanese Unexamined Patent Publication (Kokai) No. 60-13813).

The siloxane-based polymer preferably has a weight average molecular weight of about 500,000 to 5,000,000. When the siloxane-based polymer has a crosslinked structure, the gel fraction is preferably 10% by mass or more. The siloxane-based particles usually have a refractive index within a range of from about 1.40 to 1.47.

The styrene-based particles are particles of a polymer including a styrene-based monofunctional monomer unit as a main component, for example, particles of a polymer including 50% by mass or more of a styrene-based monofunctional monomer unit and is obtained by using only a styrene-based monofunctional monomer as a monomer, or may be particles of a polymer in which the entire (100% by mass) monomer unit is a styrene-based monofunctional monomer unit, or particles of a copolymer obtained by copolymerizing a styrene-based monofunctional monomer and a monofunctional monomer which is copolymerizable with the monofunctional monomer.

The styrene-based monofunctional monomer is a compound which has a styrene framework and also has one radical polymerizable double bond in the molecule. Examples thereof include, in addition to styrene, substituted styrenes, for example, halogenated styrenes such as chlorostyrene and bromostyrene; and alkylstyrenes such as vinyltoluene and α-methylstyrene.

The monofunctional monomer, which is copolymerizable with a styrene-based monofunctional monomer, is a compound which has one radical polymerizable double bond in the molecule and is copolymerizable with the styrene-based monofunctional monomer through the double bond. Examples thereof include methacrylate esters such as methyl methacrylate, ethyl methacrylate, butyl methacrylate, cyclohexyl methacrylate, phenyl methacrylate, benzyl methacrylate, 2-ethylhexyl methacrylate, and 2-hydroxyethyl methacrylate; acrylate esters such as methyl acrylate, ethyl acrylate, butyl acrylate, cyclohexyl acrylate, phenyl acrylate, benzyl acrylate, 2-ethylhexyl acrylate, and 2-hydroxyethyl acrylate; and acrylonitrile. Methacrylate esters such as methyl methacrylate are preferably used. These monomers may be used alone, or two or more kinds of them may be used in combination.

When the styrene-based particles are particles of a polymer in which the entire monomer unit is a styrene-based monofunctional monomer unit or a copolymer of a styrene-based monofunctional monomer and a monofunctional monomer which is copolymerizable with the styrene-based monofunctional monomer, the weight average molecular weight is preferably from about 500,000 to 5,000,000.

The styrene-based particles may be made of a copolymer including, as a monomer unit, a polyfunctional monomer unit which is copolymerizable with a styrene-based monofunctional monomer. The polyfunctional monomer is a compound which has two or more radical polymerizable double bonds in the molecule and is copolymerizable with a styrene-based monofunctional monomer through the double bond. Examples thereof include methacrylates of polyhydric alcohols, such as 1,4-butanediol dimethacrylate, neopentyl glycol dimethacrylate, ethylene glycol dimethacrylate, diethylene glycol dimethacrylate, tetraethylene glycol dimethacrylate, propylene glycol dimethacrylate, tetrapropylene glycol dimethacrylate, trimethylolpropane trimethacrylate, and pentaerythritol tetramethacrylate; acrylates of polyhydric alcohols, such as 1,4-butanediol diacrylate, neopentyl glycol diacrylate, ethylene glycol diacrylate, diethylene glycol diacrylate, tetraethylene glycol diacrylate, propylene glycol diacrylate, tetrapropylene glycol diacrylate, trimethylolpropane triacrylate, and pentaerythritol tetraacrylate; and aromatic polyfunctional compounds such as divinylbenzene and diallyl phthalate. These compounds may be used alone, or two or more kinds of them may be used in combination.

The copolymer with the polyfunctional monomer may be a copolymer with the monofunctional monomers described above as the monofunctional monomer which is copolymerizable with the styrene-based monofunctional monomer.

The copolymer of a styrene-based monofunctional monomer and a polyfunctional monomer, which is copolymerizable with the styrene-based monofunctional monomer, is a copolymer having a crosslinked structure, and the gel fraction is preferably 10% by mass or more.

The styrene-based polymer particles usually have a refractive index of about 1.53 to 1.61, and tend to show a large refractive index as the level of benzene framework and halogen atom content increases. The styrene-based polymer particles can be produced, for example, by a conventional polymerization method such as a suspension polymerization method, a microsuspension polymerization method, an emulsion polymerization method, or a dispersion polymerization method.

The light diffuser may be surface-treated with a surface treating agent such as a coupling agent.

An average particle diameter of the light diffuser is usually from 0.5 to 5 μm, and preferably from 0.6 to 3 μm, since it can diffuse light and can be easily dispersed in a transparent resin. The average particle diameter of the light diffuser is obtained in the following manner. That is, with respect to 40 particles selected at random from SEM micrographs taken at magnification of 5,000 or 50,000 times using a scanning electron microscope (SEM), a radius of each particle is measured using a three-point and semicircle method and a diameter is determined by doubling the measured radius, and then the diameter is averaged.

Since the light diffuser can sufficiently diffuse light when used in comparatively small amounts, an absolute value $[|\Delta n|=|n_1-n_0|]$ of a difference between the refractive index $[n_1]$ of the light diffuser and a refractive index $[n_0]$ of the transparent resin is usually 0.05 or more, and preferably 0.10 or more. The absolute value is usually adjusted to 0.50 or less.

The amount of the light diffuser to be dispersed varies depending on the absolute value $[|\Delta n|]$ of a difference in a refractive index between the light diffuser and the transparent resin and the objective degree of light diffusion, and is usually from 0.1 parts to 10 parts by mass based on 100 parts by mass of the transparent resin.

As long as the object of the present invention is not impaired, the light diffuser plate of the present invention may contain additives such as antistatic agents, antioxidants, processing stabilizers, ultraviolet absorbers, flame retardants, and lubricants. These additives may be used alone, or two or more kinds of them may be used in combination.

In the light diffuser plate of the present invention, when a thermoplastic resin is used as the transparent resin, the transparent resin and the light diffuser may be dry-blended, followed by melting with heating and further molding using a conventional molding method such as an extrusion molding method or an injection molding method. The light diffuser may be dry-blended with the transparent resin and then molded after melt-kneading with comparatively small amount of the transparent resin to form a pellet-shaped masterbatch.

The thickness of the light diffuser plate of the present invention is usually from 1 to 5 mm. When the thickness is less than 1 mm, it is disadvantageous in view of mechanical strength. In contrast, when the thickness is more than 5 mm, it is disadvantageous in view of weight properties.

Figure 2:
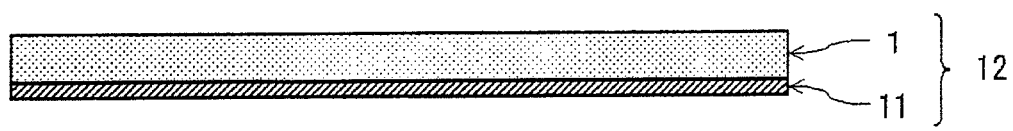
FIG. 2 is a sectional view schematically showing one example of a multi-layered light diffuser plate.
Figure 2:
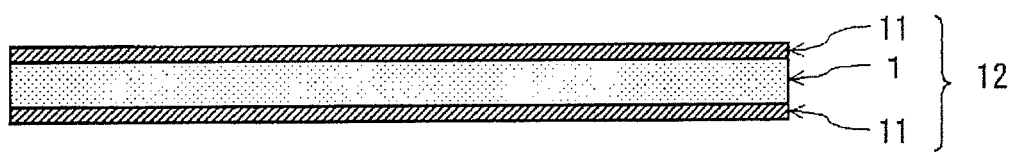

The light diffuser plate of the present invention may be used alone, or may be used as a multi-layered light diffuser plate (12) comprising a skin layer (11) having a thickness of usually 20 to 200 μm, preferably 50 to 100 μm, laminated on one surface [FIG. 2(a)] or both surfaces [FIG. 2(b)] as shown in FIG. 2. The skin layer (11) can prevent deterioration of the light diffuser plate of the present invention due to light from the outside and ultraviolet light which may be contained in light ($L_0$) from the light source (3) by laminating a material containing an ultraviolet absorber.

As the skin layer (11), for example, a skin layer formed mainly of a resin, which is compatible with a transparent resin constituting the light diffuser plate of the present invention and is transparent, is used. Examples of the resin include the same resins as those described as the transparent resin constituting the light diffuser plate of the present invention, such as polystyrene, a methyl methacrylate-styrene copolymer, a methacrylic acid-styrene copolymer, a maleic anhydride-styrene copolymer, polymethyl methacrylate, a methyl methacrylate-acrylate ester copolymer, polycarbonate, polypropylene, polycycloolefin, and a cycloolefin-α-olefin copolymer. The resin used for the skin layer may be a transparent resin wherein a light transmittance [$T_{600}$] at a wavelength of 600 nm is 85% or more measured with respect to the thickness of a 2 mm thick plate-shaped specimen, and a ratio [$T_{365}/T_{600}$] of a light transmittance [$T_{365}$] at a wavelength of 365 nm to the light transmittance [$T_{600}$] is from 0.90 to 0.99. Since the thickness of the skin layer (11) is comparatively smaller than that of the light diffuser plate and exerts a comparatively small influence on the light transmitted, the light transmittance [$T_{600}$] may be less than 85% and the light transmittance ratio [$T_{365}/T_{600}$] may be less than 0.90.

When the skin layer (11) contains an ultraviolet absorber, the ultraviolet absorber includes, for example, benzotriazole-based ultraviolet absorbers, benzophenone-based ultraviolet absorbers, cyanoacrylate-based ultraviolet absorbers, malonate ester-based ultraviolet absorbers, and oxalic acid anilide-based ultraviolet absorbers.

Examples of additives which can be contained in the skin layer (11) include, in addition to the ultraviolet absorbers described above, matting agents, light diffusers, antistatic agents, antioxidants, processing stabilizers, flame retardants, and lubricants.

The skin layer (11) can be produced, for example, by a multi-layered extrusion molding method.

An antistatic agent may be applied on the surface of the light diffuser plate of the present invention. Application of the antistatic agent prevents adhesion of dust due to static electricity and a decrease in light transmittance due to dust, thus making it possible to illuminate the transmissive image display panel (4) more brightly for a long period.

The light diffuser plate of the present invention can be used in a state of being incorporated in a surface light source (3) constituting a transmissive image display (2) as shown in FIG. 1. The transmissive image display (2) comprises a surface light source (3) and a transmissive image display panel (4).

The transmissive image display panel (4) includes, for example, a liquid crystal display panel composed of a liquid crystal cell (41) comprising a couple of transparent electrodes (not shown) and a liquid crystal compound sealed between the transparent electrodes, and a linear polarizing plate (42) disposed on both surfaces. The liquid crystal display panel may further comprise a color filter (not shown) for performing color display, and a phase difference plate (not shown) for controlling contrast and color tone when viewed from an oblique direction. The transmissive image display panel (4) is disposed at the front side of the surface light source (3).

As described above, the surface light source (3) comprises a light diffuser plate (1) and plural light sources (5). As the light sources (5), for example, a cold cathode fluorescent lamp (CCFL), an external electrode fluorescent lamp (EEFL), a flat fluorescent lamp (FFL), and a light emitting diode (LED) are used. The light sources (5) are disposed at the back side of the light diffuser plate (1).

In the transmissive image display (2), the transmissive image display panel (4) is disposed at the front side of light diffuser plate (1) constituting the surface light source (3).

In the transmissive image display (2), another light diffuser plate may be disposed between the light diffuser plate of the present invention (1) constituting the surface light source (3), and the transmissive liquid crystal display panel (4). An optical member, which illuminates the front side more brightly, may also be disposed. The optical member includes, for example, a brightness enhancement film which is commercially available from 3M, USA under the trade name of "DBEF".

EXAMPLES

The present invention will now be described in detail by way of Examples, but the present invention is not limited to the following Examples.

Extruder and T-dies used in the Examples are as follows:

extruder (1): screw diameter of 40 mm, single-screw type extruder equipped with vent, manufactured by TANABE PLASTICS MACHINERY CO., LTD.;

extruder (2): screw diameter of 20 mm, single-screw type extruder equipped with vent, manufactured by TANABE PLASTICS MACHINERY CO., LTD.; and T-dies: multi-manifold T-dies comprising two kinds of three layers, lip width of 250 mm, manufactured by Mitaka Engineering Co., Ltd.

Reference Example 1

Production of Compound for Skin Layer 75.8 parts by mass of a methyl methacrylate-styrene copolymer [melt flow rate (MFR) measured at 230° C. under 37 N: 5 g/10 min.], 23 parts by mass of a matting agent [crosslinked acrylic particles having an average particle diameter of 25 µm], 0.2 parts by mass of a processing stabilizer [manufactured by Sumitomo Chemical Co., Ltd. under the trade name of "Sumilizer GP"] and 1 part by mass of an ultraviolet absorber [manufactured by ADEKA CORPORATION under the trade name of "Adekastab LA-31"] were dry-blended and then pelletized at a temperature of 180 to 260° C. using a twin-screw extruder having a screw diameter of 65 mm to obtain a pellet-shaped compound for skin layer.

Reference Example 2

Production of Light Diffuser Masterbatch 84 parts by mass of polystyrene [MFR measured at 230° C. under a load of 37 N: 4 g/10 min.], 14 parts by mass of a light diffuser [crosslinked acrylic particles having an average particle diameter of 0.8 µm], 1 part by mass of an ultraviolet absorber [KYODO CHEMICAL CO., LTD. "VIOSORB 520"] and 1 part by mass of a processing stabilizer [manufactured by Sumitomo Chemical Co., Ltd. under the trade name of "Sumilizer GP"] were dry- blended and then pelletized at a temperature of 80 to 250° C. using a twin-screw extruder having a screw diameter of 65 mm to obtain a pellet-shaped light diffuser masterbatch.

Reference Example 3

Measurement of Light Transmittance and MFR of Transparent Resin

Each of pellet-shaped polystyrenes A to D shown in Table 1 was charged in a hopper for raw material of an extruder (1) and then extruded into a 2 mm thick plate at a cylinder temperature of 200 to 250° C. to obtain specimens. Using these specimens, a light transmittance [$T_{365}$] at a wavelength of 365 nm and a light transmittance [$T_{600}$] at a wavelength of 600 nm were measured by a spectrometer provided with an integrating sphere (manufactured by Hitachi, Ltd. under the trade name of U4000) and a ratio [$T_{365}/T_{600}$] was determined.

In conformity with JIS K 7210, an MFR of the resultant polystyrenes was measured under the conditions of a temperature of 230° C. under a load of 37 N. The results are shown in Table 1.

TABLE 1

| Transparent resin | $T_{365}$ (%) | $T_{600}$ (%) | $T_{365}/T_{600}$ | MFR (g/min.) |
|---|---|---|---|---|
| Polystyrene A | 87.26 | 90.31 | 0.97 | 4.0 |
| Polystyrene B | 75.42 | 89.08 | 0.85 | 4.7 |
| Polystyrene C | 79.75 | 90.23 | 0.88 | 5.4 |
| Polystyrene D | 73.65 | 90.03 | 0.82 | 5.4 |

Example 1

Production of Multi-Layered Light Diffuser Plate 13 parts by mass of the light diffuser masterbatch obtained in Reference Example 2 and 87 parts by mass of the polystyrene A were dry-blended, charged in a hopper for raw material of the extruder (1), melt-kneaded through T-dies maintained at a temperature of 245 to 250° C. while maintaining the vacuum degree of a vent portion at 100 kPa (gauge pressure) at a temperature of 200 to 250° C. so as to form an intermediate layer, thus obtaining a light diffuser plate (1). At the same time, the compound for skin layer obtained in Reference Example 1 was charged in a hopper for raw material of the extruder (2), melt-kneaded through the above T-dies while maintaining the vacuum degree of the vent portion at 100 kPa (gauge pressure) at a temperature of 190 to 250° C. so as to laminate as a skin layer (11) on both surfaces of the above intermediate layer, thus obtaining a three-layered structure multi-layered light diffuser plate having a width of 220 mm (12) comprising a light diffuser plate having a thickness of 1.9 mm (1) and a skin layer having a thickness of 50 μm (11) formed on both surfaces of the light diffuser plate.

Preparation of Evaluation Sample

The multi-layered light diffuser plate was cut into two pieces measuring 423 mm in an extrusion direction (MD direction) and 163 mm in a direction perpendicularly intersecting to the extrusion direction (TD direction), and then two pieces were laminated using chloroform to obtain an evaluation sample.

Evaluation 1

From a surface light source (3) constituting a commercially available liquid crystal display, plural cold cathode fluorescent lamps (5) being disposed at the back side of a light diffuser plate (1), the light diffuser plate (1) was removed. Only the evaluation sample obtained above was mounted in place of the surface light source and luminance was measured at 2,601 points on the entire front side of the surface light source (3) while turning the cold cathode fluorescent lamps (5) on, using a luminance meter [manufactured by I System Corporation "Eye Scale 3W Multi-Point Luminance Meter"], and then an average was determined. The results are shown in Table 2.

Evaluation 2

In the same manner as described above, two film-like light diffuser plates [which constitute a commercially available liquid crystal displays] were laminated on the evaluation sample obtained above and also one brightness enhancement film [manufactured by 3M, USA under the trade name of "DBEF"] was laminated, a luminance was measured and an average was determined. The results are shown in Table 2.

Comparative Examples 1 to 3

In the same manner as in Example 1, except that a polystyrene B [Comparative Example 1], a polystyrene C [Comparative Example 2] and a polystyrene D [Comparative Example 3] were respectively used in place of the polystyrene A, the operation was carried out to obtain multi-layered light diffuser plates and evaluation was carried out. The results are shown in Table 2.

TABLE 2

| | | | Luminance (Cd/m$^2$) | |
|---|---|---|---|---|
| | Transparent resin | $T_{365}/T_{600}$ | Evaluation 1 | Evaluation 2 |
| Example 1 | Polystyrene A | 0.97 | 5,747 | 6,294 |
| Comparative Example 1 | Polystyrene B | 0.85 | 5,566 | 5,862 |
| Comparative Example 2 | Polystyrene C | 0.88 | 5,561 | 5,867 |
| Comparative Example 3 | Polystyrene D | 0.82 | 5,557 | 5,865 |

The preferred embodiments of the present invention are listed below.

[1] A light diffuser plate comprising a transparent resin and a light diffuser dispersed in the transparent resin, wherein the transparent resin is a transparent resin which has a light transmittance [$T_{600}$] at a wavelength of 600 nm of 85% or more measured with respect to a thickness of a 2 mm thick plate-shaped specimen, and a ratio [$T_{365}/T_{600}$] of a light transmittance [$T_{365}$] at a wavelength of 365 nm to the light transmittance [$T_{600}$] is 0.90 to 0.99.

[2] The light diffuser plate according to [1], wherein the transparent resin is polystyrene, a methyl methacrylate-styrene copolymer, a methacrylic acid-styrene copolymer, a maleic anhydride-styrene copolymer, polymethyl methacrylate, a methyl methacrylate-acrylate ester copolymer, polycarbonate, polypropylene, polycycloolefin, or a cycloolefin-α-olefin copolymer.

[3] The light diffuser plate according to [1] or [2], wherein the light diffuser comprises acrylic particles or siloxane-based particles.

[4] The light diffuser plate according to any one of [1] to [3], wherein an average particle diameter of the light diffuser is from 0.5 to 5 μm, an absolute value [|Δn|] of a difference in a refractive index between the light diffuser and the transparent resin is 0.05 or more, and an amount of the light diffuser dispersed is from 0.1 to 10 parts by mass based on 100 parts by mass of the transparent resin.

[5] The light diffuser plate according to any one of [1] to [4], which has a thickness within a range of from 1 to 5 mm.

[6] A surface light source comprising the light diffuser plate according to any one of [1] to [5], and plural light sources disposed at the back side of the light diffuser plate.

[7] A transmissive image display comprising the surface light source according to [6], and a transmissive image display panel disposed at the front side of the light diffuser plate.

What is claimed is:

1. A light diffuser plate comprising a transparent resin and a light diffuser dispersed in the transparent resin, wherein the transparent resin is a transparent resin which has a light transmittance $[T_{600}]$ at a wavelength of 600 nm of 85% or more measured with respect to a thickness of a 2 mm thick plate-shaped specimen, and a ratio $[T_{365}/T_{600}]$ of a light transmittance $[T_{365}]$ at a wavelength of 365 nm to the light transmittance $[T_{600}]$ is 0.90 to 0.99.

2. The light diffuser plate according to claim 1, wherein the transparent resin is polystyrene, a methyl methacrylate-styrene copolymer, a methacrylic acid-styrene copolymer, a maleic anhydride-styrene copolymer, polymethyl methacrylate, a methyl methacrylate-acrylate ester copolymer, polycarbonate, polypropylene, polycycloolefin, or a cycloolefin-α-olefin copolymer.

3. The light diffuser plate according to claim 1, wherein the light diffuser comprises acrylic particles or siloxane-based particles.

4. The light diffuser plate according to any one of claims 1 to 3, wherein an average particle diameter of the light diffuser is from 0.5 to 5 µm, an absolute value $[|\Delta n|]$ of a difference in a refractive index between the light diffuser and the transparent resin is 0.05 or more, and an amount of the light diffuser dispersed is from 0.1 to 10 parts by mass based on 100 parts by mass of the transparent resin.

5. The light diffuser plate according to any one of claims 1 to 3, which has a thickness within a range of from 1 to 5 mm.

6. A surface light source comprising the light diffuser plate according to any one of claims 1 to 3, and plural light sources disposed at the back side of the light diffuser plate.

7. A transmissive image display comprising the surface light source according to claim 6, and a transmissive image display panel disposed at the front side of the light diffuser plate.

* * * * *